(12) United States Patent
Wang (10) Patent No.: US 8,466,682 B2
(45) Date of Patent: Jun. 18, 2013

(54) APPARATUS AND METHOD FOR DOWNHOLE ELECTROMAGNETIC MEASUREMENT WHILE DRILLING

(75) Inventor: Tsili Wang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 389 days.

(21) Appl. No.: 12/568,869

(22) Filed: Sep. 29, 2009

(65) Prior Publication Data
US 2011/0074428 A1 Mar. 31, 2011

(51) Int. Cl.
*G01V 3/00* (2006.01)

(52) U.S. Cl.
USPC ........... 324/338; 324/343; 324/339; 343/719; 343/788; 702/9; 702/11

(58) Field of Classification Search
USPC .................................. 324/338, 343
See application file for complete search history.

(56) References Cited

U.S. PATENT DOCUMENTS

| | | | |
|---|---|---|---|
| 4,899,112 A | 2/1990 | Clark et al. | |
| 4,968,940 A * | 11/1990 | Clark et al. | 324/338 |
| 5,045,795 A | 9/1991 | Gianzero et al. | |
| 5,321,982 A | 6/1994 | Fay et al. | |
| 5,329,448 A | 7/1994 | Rosthal | |
| 5,389,881 A | 2/1995 | Bittar et al. | |
| 5,594,343 A * | 1/1997 | Clark et al. | 324/338 |
| 5,869,968 A | 2/1999 | Brooks et al. | |
| 6,163,155 A | 12/2000 | Bittar | |
| 6,181,138 B1 | 1/2001 | Hagiwara et al. | |
| 6,297,639 B1 | 10/2001 | Clark et al. | |
| 6,476,609 B1 | 11/2002 | Bittar | |
| 6,509,738 B1 | 1/2003 | Minerbo et al. | |
| 6,556,015 B1 * | 4/2003 | Omeragic et al. | 324/338 |
| 6,563,314 B1 * | 5/2003 | Kleinberg | 324/303 |
| 6,566,881 B2 * | 5/2003 | Omeragic et al. | 324/338 |
| 6,573,722 B2 | 6/2003 | Rosthal et al. | |
| 6,646,441 B2 | 11/2003 | Thompson et al. | |
| 6,703,837 B1 * | 3/2004 | Wisler et al. | 324/338 |
| 6,777,940 B2 * | 8/2004 | Macune | 324/338 |
| 6,819,110 B2 | 11/2004 | Omeragic et al. | |
| 6,836,218 B2 | 12/2004 | Frey et al. | |

(Continued)

FOREIGN PATENT DOCUMENTS

EP 715188 A2 6/1996

OTHER PUBLICATIONS

Fang, S., et al.; "Determination of structural dip and azimuth from LWD azimuthal propagation resistivity measurements in anisotropic formations". 2008 SPE Annual Technical Conference and Exhibition, Denver, CO, Sep. 21-24, 2008.

(Continued)

*Primary Examiner* — Melissa Koval
*Assistant Examiner* — Benjamin M Baldridge
(74) *Attorney, Agent, or Firm* — Kenneth Liu; Darla Fonseca (57) ABSTRACT

A directional resistivity tool includes a pair of transmitters deployed between at least one pair of receivers. Each of the transmitters and receivers preferably includes collocated z-mode and x-mode antennae. Exemplary embodiments may further include additional receivers, for example, additional pairs of receivers deployed axially about the transmitters or one or more deep reading receivers deployed on one axial end of the transmitters. Tools in accordance with the invention enable directional resistivity measurements to be acquired at multiple depths of investigation using fewer transmitter firings than conventional tools.

17 Claims, 3 Drawing Sheets

U.S. PATENT DOCUMENTS

| | | | |
|---|---|---|---|
| 6,903,553 B2 | 6/2005 | Itskovich et al. | |
| 6,911,824 B2 | 6/2005 | Bittar | |
| 6,930,652 B2 | 8/2005 | Smith et al. | |
| 6,937,022 B2 | 8/2005 | Itskovich et al. | |
| 6,969,994 B2 | 11/2005 | Minerbo et al. | |
| 6,998,844 B2 | 2/2006 | Omeragic et al. | |
| 7,003,401 B2 | 2/2006 | Haugland | |
| 7,019,528 B2 | 3/2006 | Bittar | |
| 7,038,457 B2 * | 5/2006 | Chen et al. | 324/339 |
| 7,057,392 B2 | 6/2006 | Wang et al. | |
| 7,138,803 B2 | 11/2006 | Bittar | |
| 7,202,670 B2 | 4/2007 | Omeragic et al. | |
| 7,265,552 B2 | 9/2007 | Bittar | |
| 7,269,515 B2 | 9/2007 | Tabarovsky et al. | |
| 7,274,991 B2 | 9/2007 | Tabarovsky et al. | |
| 7,286,091 B2 * | 10/2007 | Chen et al. | 343/719 |
| 7,345,487 B2 | 3/2008 | Bittar et al. | |
| 7,353,613 B2 | 4/2008 | Bartel et al. | |
| 7,382,135 B2 | 6/2008 | Li et al. | |
| 7,385,400 B2 * | 6/2008 | Moore | 324/338 |
| 7,414,407 B2 * | 8/2008 | Wang et al. | 324/338 |
| 7,436,184 B2 | 10/2008 | Moore | |
| 7,463,035 B2 * | 12/2008 | Merchant et al. | 324/339 |
| 7,471,088 B2 * | 12/2008 | Yu et al. | 324/339 |
| 7,839,149 B2 * | 11/2010 | Wang et al. | 324/343 |
| 2002/0101242 A1 * | 8/2002 | Bittar | 324/338 |
| 2002/0186013 A1 * | 12/2002 | Tabarovsky et al. | 324/343 |
| 2003/0057950 A1 | 3/2003 | Gao et al. | |
| 2005/0088180 A1 * | 4/2005 | Flanagan | 324/338 |
| 2008/0068022 A1 * | 3/2008 | Peter et al. | 324/338 |
| 2008/0068023 A1 * | 3/2008 | Peter et al. | 324/338 |
| 2008/0074336 A1 | 3/2008 | Signorelli et al. | |
| 2008/0078580 A1 | 4/2008 | Bittar | |
| 2008/0136419 A1 * | 6/2008 | Seydoux et al. | 324/333 |
| 2008/0143336 A1 * | 6/2008 | Legendre et al. | 324/339 |
| 2008/0158082 A1 * | 7/2008 | Wang et al. | 343/788 |
| 2008/0246486 A1 | 10/2008 | Forgang et al. | |
| 2008/0290873 A1 * | 11/2008 | Homan et al. | 324/337 |
| 2009/0015261 A1 * | 1/2009 | Yang et al. | 324/343 |
| 2009/0198447 A1 * | 8/2009 | Legendre et al. | 702/11 |
| 2009/0230968 A1 * | 9/2009 | Bittar et al. | 324/338 |
| 2010/0030477 A1 * | 2/2010 | Yang et al. | 702/9 |
| 2010/0123462 A1 | 5/2010 | Bittar | |
| 2010/0126717 A1 * | 5/2010 | Kuchuk et al. | 166/250.03 |
| 2011/0180327 A1 * | 7/2011 | Bittar et al. | 175/61 |

OTHER PUBLICATIONS

Li, Q., et al.; "New directional electromagnetic tool for proactive geosteering and accurate formation evaluation while drilling". SPWLA 46th Annual Logging Symposium, Jun. 26-29, 2005, pp. 1-16.

International Search Report and Written Opinion of PCT/US2010/028451, issued Nov. 29, 2010, 10 pages.

International Search Report of PCT/US2010/050625, issued May 25, 2011, 3 pages.

Written Opinion of the International Searching Authority of PCT/US2010/050625 issued May 25, 2011, 4 pages.

\* cited by examiner

APPARATUS AND METHOD FOR DOWNHOLE ELECTROMAGNETIC MEASUREMENT WHILE DRILLING

RELATED APPLICATIONS

None.

FIELD OF THE INVENTION

The present invention relates generally to downhole measurement tools utilized for measuring electromagnetic properties of a subterranean borehole. More particularly, embodiments of this invention relate to a directional resistivity logging while drilling tool having first and second axially spaced transmitters deployed axially between at least one pair of receivers.

BACKGROUND OF THE INVENTION

The use of electrical measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Formation resistivity (or conductivity) is commonly measured by transmitting an electromagnetic wave through a formation using a length of antenna wire wound about a downhole tool. As is well known to those of ordinary skill in the art, a time varying electric current (an alternating current) in a transmitting antenna produces a corresponding time varying magnetic field in the formation. The magnetic field in turn induces electrical currents (eddy currents) in a conductive formation. These eddy currents further produce secondary magnetic fields which may produce a voltage response in a receiving antenna. The measured voltage in the receiving antennae can be processed, as is known to those of ordinary skill in the art, to obtain one or more measurements of the secondary magnetic field, which may in turn be further processed to estimate formation resistivity (conductivity) and/or dielectric constant. These electrical formation properties can be further related to the hydrocarbon bearing potential of the formation via techniques known to those of skill in the art.

It is also well known that a transmitted electromagnetic wave is typically both attenuated and phase shifted by an amount related to the resistivity and/or dielectric constant of the formation. The transmitted wave is commonly received at first and second spaced receiving antennae. The attenuation and phase shift between the first and second receivers may be acquired by taking a ratio of the received waves. The attenuation and/or phase shift may then be utilized to estimate the formation resistivity and/or dielectric constant. In order to acquire more data, e.g., at multiple depths of investigation into the formation, it is well known to make the above measurements using multiple spaced transmitters since the depth of penetration of an electromagnetic wave into the formation tends to increase with increased spacing between the transmitter and receiver. The use of multiple perturbation frequencies is also a known means of investigating multiple depths of investigation since the depth of penetration tends to be inversely related to the frequency of the propagated electromagnetic waves.

Figures 1, 2:
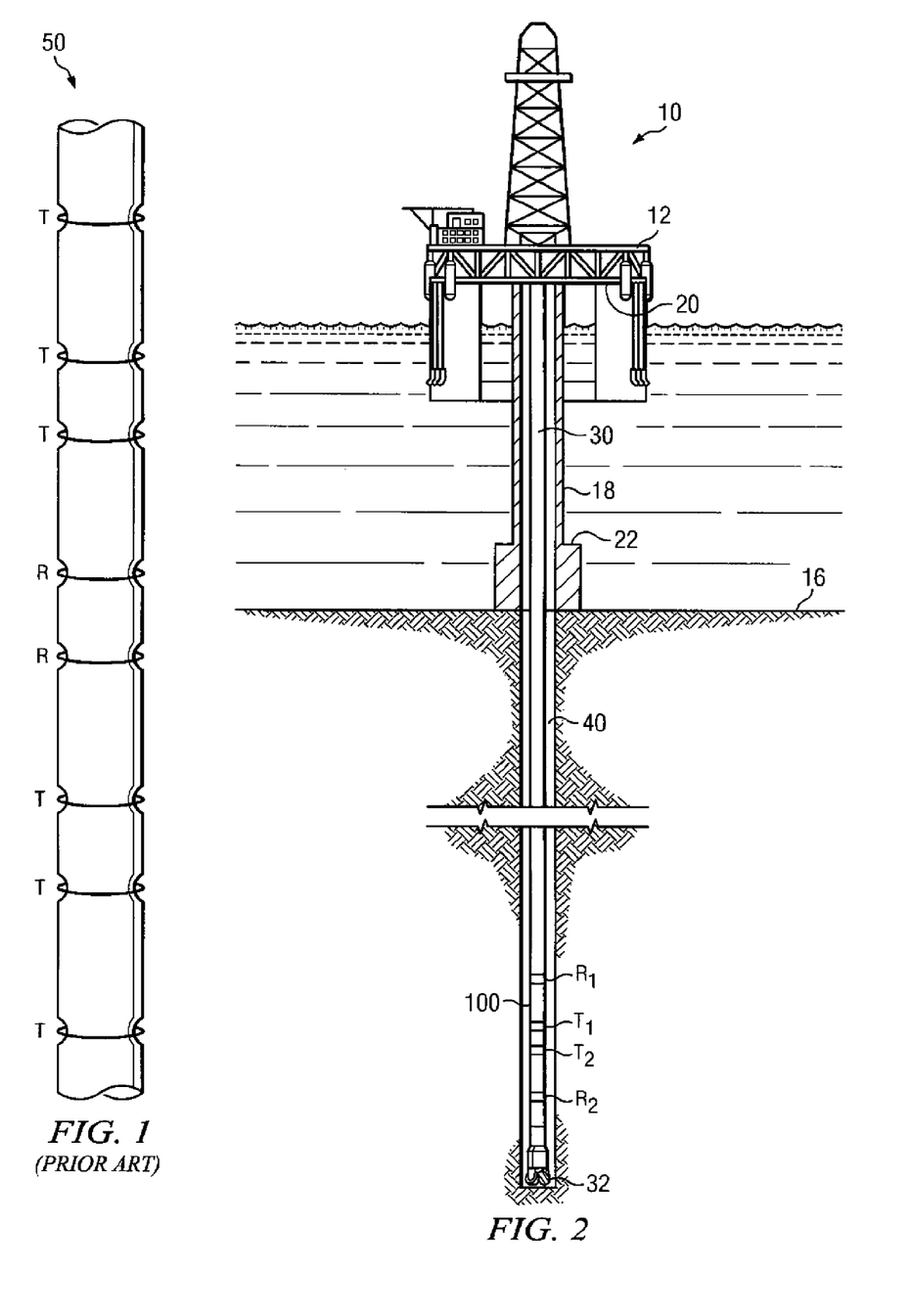
FIG. 1 depicts a prior art LWD resistivity tool.
FIG. 2 depicts a conventional drilling rig on which exemplary embodiments of the present invention may be utilized.

FIG. 1 depicts a well known and commercially available prior art resistivity tool 50. The tool embodiment depicted includes first and second receivers R deployed symmetrically between multiple pairs of transmitters T. In use the transmitters are typically fired sequentially and the corresponding induced voltage response measured at each of the receivers. The attenuation and phase difference may be determined by taking a ratio of the received voltage signals. To compensate for instrument noise and/or other borehole effects the attenuation and phase difference from each of the transmitter pairs may be averaged to essentially cancel out the error term.

Directional resistivity measurements are also commonly utilized to provide information about remote geological features (e.g., remote beds, bed boundaries, faults, and/or fluid contacts) not intercepted by the measurement tool. Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Real-time distance and direction measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

Methods are known in the art for making LWD directional resistivity measurements and commonly involve transmitting and/or receiving transverse (x-mode or y-mode) or mixed mode (e.g., mixed x- and z-mode) electromagnetic waves. Various tool configurations are known in the art for making such measurements. In one advantageous tool configuration, a plurality of collocated x-mode and z-mode transmitting and receiving antennae are utilized. A tool configuration similar to that depicted on FIG. 1 may be utilized with each of the transmitters and receivers including such a collocated antenna arrangement.

One drawback with such an arrangement is that it requires a large number of sequential transmitter firings within each measurement cycle. This drawback is particularly acute for directional resistivity tools since a directional resistivity tool must make, for a single depth level, multiple measurements corresponding to various azimuth angles to provide sufficient azimuthal coverage. A large number of transmitters combined with a large number of azimuthal measurements can lead to an enormous number of sequential firings. For example, the tool configuration depicted on FIG. 1 requires 12 sequential firings per measurement cycle (x-mode and z-mode firings at each transmitter) in which the x-mode transmitter must be fired for a sufficient length of time period to allow collection of multiple measurements at various azimuth angles. Such a large number of transmitter firings reduces the allowable acquisition time for each firing and therefore tends to reduce data accuracy. Therefore, there remains a need in the art for an improved directional resistivity tool and in particular a tool configuration that reduces the number of required transmitter firings.

SUMMARY OF THE INVENTION

Aspects of the present invention are intended to address the above described need for improved directional resistivity tools and improved methods for making directional resistivity measurements. In one exemplary embodiment, the invention includes a directional resistivity tool having a pair of transmitters deployed between at least one pair of receivers. Each of the transmitters and receivers preferably includes collocated z-mode and x-mode antennae. Serviceable tool embodiments commonly include additional receivers, for example, one or more deep reading receivers deployed on one axial end of the transmitters. The tool further includes a controller configured to acquire compensated resistivity measurements. Aspects of the invention also include methods for acquiring compensated resistivity and directional resistivity measurements.

Exemplary embodiments of the present invention may advantageously provide several technical advantages. For example, tools in accordance with the present invention enable compensated resistivity measurements and directional resistivity measurements to be acquired at multiple depths of investigation using fewer transmitter firings than conventional tools. This tends to improve accuracy and also preserves limited downhole power. These savings can be particularly significant for directional resistivity measurements.

In one aspect the present invention includes a directional resistivity logging while drilling tool. The tool includes an LWD tool body having a longitudinal axis. First and second adjacent transmitters are deployed on the tool body axially between at least one pair of receivers (first and second receivers). At least one of the first and second transmitters and the first and second receivers has a transverse magnetic moment. Each of the first and second receivers preferably include collocated z-mode and x-mode antennae.

In another aspect, the present invention includes a method for making a compensated logging while drilling resistivity measurement. The method includes rotating a resistivity LWD tool in a borehole. The tool includes first and second adjacent transmitters deployed on the tool body and axially between at least one pair of receivers. Each of the transmitters and receivers includes collocated z-mode and x-mode antennae configured for transmitting and receiving z-mode and x-mode electromagnetic waves. The method further includes causing the first and second transmitters to sequentially transmit corresponding first and second z-mode electromagnetic waves and causing the first and second receivers to receive each of the transmitted first and second z-mode electromagnetic waves. Compensated resistivity measurements are then computed from received the electromagnetic waves.

In still another aspect, the invention includes a method for making compensated directional resistivity measurements. The method includes rotating a resistivity tool in a borehole. The tool includes first and second adjacent transmitters deployed on the tool body axially between at least one pair of receivers. Each of the transmitters and receivers includes collocated z-mode and x-mode antennae configured for transmitting and receiving z-mode and x-mode electromagnetic waves. The method further includes causing at least one of the transmitters to sequentially transmit first and second z-mode and x-mode electromagnetic waves and causing at least one of the receivers to receive z-mode and x-mode components of each of the first and second transmitted electromagnetic waves. Compensated directional resistivity measurements are computed from the received electromagnetic waves.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Referring now to FIGS. 2 through 7, exemplary embodiments of the present invention are depicted. With respect to FIGS. 2 through 7, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 2 through 7 may be described herein with respect to that reference numeral shown on other views.

FIG. 2 depicts one exemplary embodiment of a measurement tool 100 in use in an offshore oil or gas drilling assembly, generally denoted 10. In FIG. 2, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100. Embodiments of LWD tool 100 include a pair of transmitters $T_1$ and $T_2$ deployed between at least one pair of receivers $R_1$ and $R_2$. Exemplary embodiments of the invention may further include an azimuth sensor (not shown). Suitable azimuth sensors may include substantially any sensor that is sensitive to its azimuth (tool face) on the tool 100 (e.g., relative to high side, low side, left side, right side, etc.), such as one or more accelerometers, magnetometers, and/or gyroscopes. Drill string 30 may further include a downhole drill motor, a mud pulse telemetry system, and one or more of numerous other sensors, such as a nuclear logging instrument, for sensing downhole characteristics of the borehole and the surrounding formation.

It will be understood by those of ordinary skill in the art that the deployment depicted on FIG. 2 is merely exemplary for purposes of describing the invention set forth herein. It will be further understood that the measurement tool 100 of the present invention is not limited to use with a semisubmersible platform 12 as illustrated on FIG. 1. Measurement tool 100 is equally well suited for use with any kind of subterranean drilling operation, either offshore or onshore. While measurement tool 100 is shown coupled with drill string 30 on FIG. 2, it will also be understood that the invention is not limited to logging while drilling (LWD) embodiments.

Figure 3:
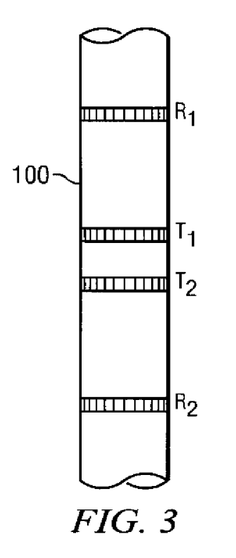
FIG. 3 depicts one exemplary embodiment of an LWD direction resistivity tool in accordance with the present invention.

FIG. 3 depicts a portion of one exemplary embodiment of measurement tool 100. In the exemplary embodiment depicted measurement tool 100 includes a directional resistivity LWD tool including a pair of transmitters $T_1$ and $T_2$ deployed axially between a pair of receivers $R_1$ and $R_2$. This configuration is distinct from the prior art arrangement depicted on FIG. 1 in which the receiver pair is deployed between the transmitters.

Figure 4:
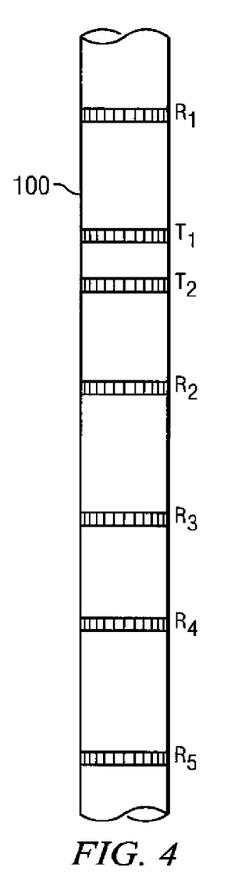
FIG. 4 depicts an alternative embodiment of an LWD directional resistivity tool in accordance with the present invention.

FIG. 4 depicts a further exemplary embodiment of measurement tool 100. In the exemplary embodiment depicted, measurement tool 100 is configured for making deep-reading directional resistivity measurements. Transmitters $T_1$ and $T_2$ are deployed axially between receivers $R_1$ and $R_2$ as described above. The tool further includes deep reading receivers $R_3$, $R_4$, and $R_5$ deployed on one axial side of the transmitter pair. Those of ordinary skill in the art will appreciate that substantially any number of deep reading receivers may be utilized.

Figure 5:
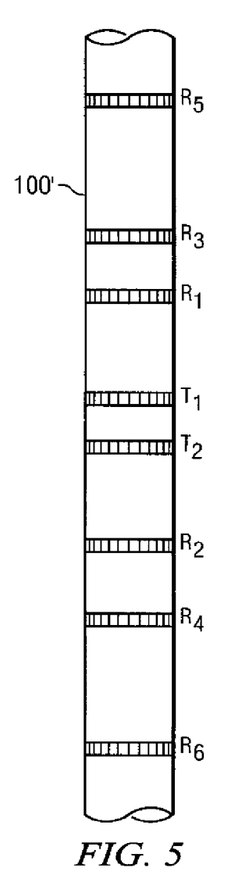
FIG. 5 depicts another alternative embodiment of an LWD directional resistivity tool in accordance with the present invention.

FIG. 5 depicts an alternative embodiment 100' for making deep-reading directional resistivity measurements. Transmitters $T_1$ and $T_2$ are deployed axially between a plurality of receiver pairs (pair $R_1$ and $R_2$, pair $R_3$ and $R_4$, and pair $R_5$ and $R_6$ in the exemplary embodiment depicted).

With continued reference to FIGS. 3, 4, and 5 and further reference now to FIG. 6, each of the transmitters and receivers preferably includes collocated z-mode and x-mode antennae. As such, the transmitters $T_1$ and $T_2$ are configured to transmit z-mode and x-mode electromagnetic waves and the receivers $R_1$, $R_2$, $R_3$, $R_4$, $R_5$, and $R_6$ are configured to receive z-mode and x-mode electromagnetic waves.

Figure 6A:
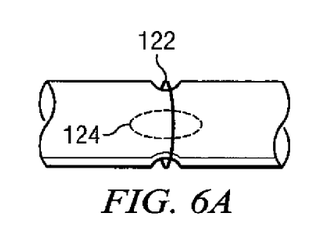
FIGS. 6A, 6B, 6C, and 6D (collectively FIG. 6) depict exemplary embodiments of collocated transmitters and/or receivers suitable for use in the embodiments depicted on FIGS. 3, 4, and 5.

Exemplary collocated antenna configurations suitable for use with the present invention are depicted on FIGS. 6A-6D (collectively FIG. 6). In each configuration, the transmitter and/or receiver includes z-mode and x-mode antennae configured for transmitting and/or receiving axial and transverse electromagnetic waves. FIG. 6A depicts a configuration including a conventional z-mode antenna 122 and an x-mode antenna 124 including a planar loop of antenna wire deployed substantially parallel with a longitudinal axis of the tool (such that the antenna 124 has a dipole moment that is transverse to the axis).

Figure 6B:
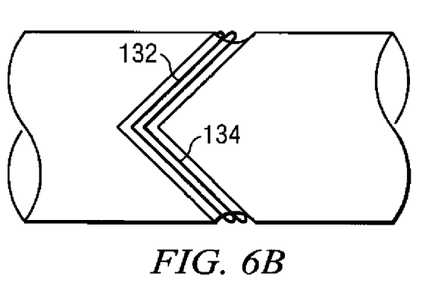
Figure 6C:
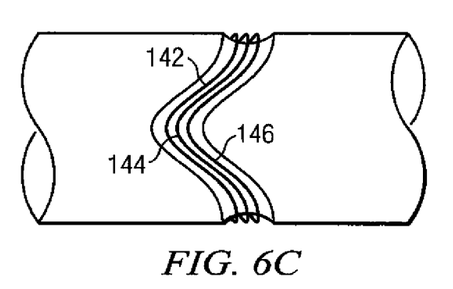

FIG. 6B depicts a configuration including first and second bi-planar antennae 132 and 134 in which first and second semi-elliptical (or semi-oval) sections of antenna wire reside on corresponding distinct geometric planes. In the embodiment depicted, one of the antennae 132 and 134 is configured as a z-mode antenna and the other is configured as an x-mode antenna. FIG. 6C depicts a configuration including at least first and second serpentine antennae 142 and 144 in which the antenna wire loops about the tool body such that the axial separation between the non-planar loop of antenna wire and a circular centerline of the antennae varies periodically (e.g., sinusoidally) with respect to the azimuth angle about the circumference of the tool. In the embodiment depicted, one of the antennae 142 and 144 is configured as a z-mode antenna and the other is configured as an x-mode antenna. Such serpentine configurations may advantageously further include a third antenna 146 configured as a y-mode antenna. The embodiments depicted on FIGS. 6B and 6C are disclosed in commonly assigned and co-pending U.S. patent application Ser. No. 12/410,153 (now U.S. Patent Publication 2010/0244841), which is hereby fully incorporated by reference.

Figure 6D:
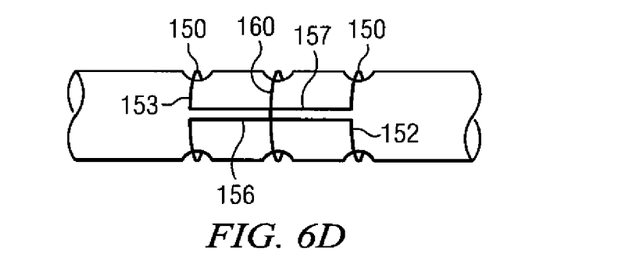

FIG. 6D depicts a configuration including a conventional z-mode antenna 160 and a saddle coil 150 configured to transmit and/or receive x-mode electromagnetic waves. The saddle coil includes first and second circumferential portions 152 and 153 and first and second parallel axial portions 156 and 157 and is configured as an x-mode antenna. In the exemplary embodiment depicted, the conventional axial antenna 160 is deployed axially between first and second circumferential portions 152 and 153 of the saddle coil.

Figure 7:
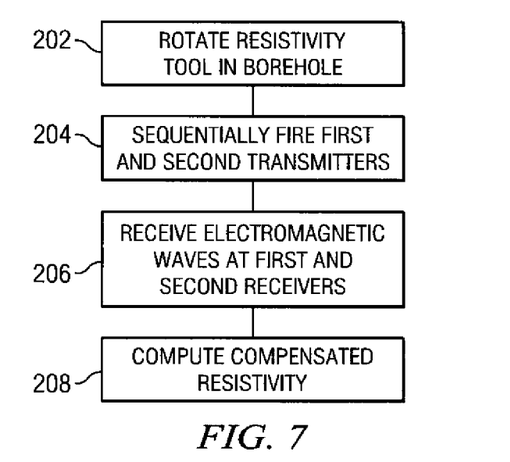
FIG. 7 depicts a flow chart of one exemplary method embodiment in accordance with the present invention.

With reference now to FIG. 7, one exemplary method embodiment in accordance with the present invention is depicted in flow chart form. Measurement tool 100 (or 100') is rotated in a borehole at 202 and the transmitters $T_1$ and $T_2$ are fired sequentially at 204. This typically (but not necessarily) includes four sequential firings (two x-mode firings and two z-mode firings). The transmitters may be fired in any order. In order to reduce coupling effects between the transmitters, each transmitter may be configured to be open circuit when the other is fired (e.g., $T_2$ may be open circuit when $T_1$ is fired). Methods in accordance with the invention may be advantageously utilized to obtain both non-azimuthal (non-directional) z-mode and directional resistivity measurements.

At 206, axial and transverse components (z-mode and x-mode waves) are received at each of the receivers. For example only, in the embodiment depicted on FIG. 4, z-mode and x-mode electromagnetic waves are received at each of receivers $R_1$, $R_2$, $R_3$, $R_4$, and $R_5$ for a total of 10 received signals per transmitted electromagnetic wave. Coupling between adjacent receivers is typically insignificant due to the greater axial spacing between the adjacent receivers. At 208, the received waves may be processed to compute compensated measurements at each receiver or at each pair of receivers. These compensated measurements may be processed using techniques known to those of ordinary skill in the art and are intended to remove amplitude and phase errors (distortion) from the received signals. Reception and compensation are now described in more detail.

Those of ordinary skill in the art will readily appreciate that the magnetic field derived from a measured voltage at a receiving antenna is proportional to the true magnetic field induced in the formation, but differs therefrom due to several known factors. This distortion of the measured magnetic field may be represented mathematically, for example, as follows:

$$H(\omega) = A_T(\omega) e^{i\Delta\phi_T} A_R(\omega) e^{i\Delta\phi_R} H^*(\omega) \qquad \text{Equation 1}$$

where $H(\omega)$ represents the measured (received) magnetic field, $H^*(\omega)$ represents a true (or theoretical) magnetic field in the formation, $A_T(\omega)$ and $\Delta\phi_T$ represent amplitude and phase distortion of the true formation magnetic field introduced by the transmitter, $A_R(\omega)$ and $\Delta\phi_R$ represent the amplitude and phase distortion of the true formation magnetic field introduced by the receiver, and $\omega$ represents the angular frequency (or frequencies) of the electromagnetic wave in units of radians. As is known to those of skill in the art, the amplitude and phase errors may include the magnetic moments of the antennae, electronic drift and distortion, and other environment effects related to the tool position in the borehole.

With reference again to FIG. 3, conventional z-mode (non-azimuthal) measurements may be obtained by sequentially firing the z-mode antennae in transmitters $T_1$ and $T_2$ (at 202). The measured magnetic fields at each of the receivers may be represented mathematically in similar form to Equation 1, for example, as follows:

$$H_{11}(\omega) = A_{T1}(\omega)e^{i\Delta\phi_{T1}}A_{R1}(\omega)e^{i\Delta\phi_{R1}}H^*_{11}(\omega)$$

$$H_{12}(\omega) = A_{T1}(\omega)e^{i\Delta\phi_{T1}}A_{R2}(\omega)e^{i\Delta\phi_{R2}}H^*_{12}(\omega)$$

$$H_{21}(\omega) = A_{T2}(\omega)e^{i\Delta\phi_{T2}}A_{R1}(\omega)e^{i\Delta\phi_{R1}}H^*_{21}(\omega)$$

$$H_{22}(\omega) = A_{T2}(\omega)e^{i\Delta\phi_{T2}}A_{R2}(\omega)e^{i\Delta\phi_{R2}}H^*_{22}(\omega) \quad \text{Equation 2}$$

where $H_{ij}(\omega)$ represent the induced magnetic field received by the each of the receivers $R_1$ and $R_2$ for each of the transmitted electromagnetic waves (from transmitters $T_1$ and $T_2$). It will be understood that within this system for naming the measured magnetic fields, the first index indicates the transmitter and the second index indicates the receiver. With continued reference to Equation 2, $A_{T1}(\omega)$, $\Delta\phi_{T1}$, $A_{T2}(\omega)$ and $\Delta\phi_{T2}$ represent amplitude and phase errors introduced by the first and second transmitters $T_1$ and $T_2$, and $A_{R1}(\omega)$, $\Delta\phi_{R1}$, $A_{R2}(\omega)$ and $\Delta\phi_{R2}$ represent amplitude and phase errors introduced by the first and second receivers $R_1$ and $R_2$.

Computing a product of the two far-to-near ratios of received magnetic fields yields:

$$\frac{A_{T1}(\omega)e^{i\Delta\phi_{T1}}A_{R2}(\omega)e^{i\Delta\phi_{R2}}H^*_{12}(\omega) \cdot}{A_{T1}(\omega)e^{i\Delta\phi_{T1}}A_{R1}(\omega)e^{i\Delta\phi_{R1}}H^*_{11}(\omega) \cdot} \frac{A_{T2}(\omega)e^{i\Delta\phi_{T2}}A_{R1}(\omega)e^{i\Delta\phi_{R1}}H^*_{21}(\omega)}{A_{T2}(\omega)e^{i\Delta\phi_{T2}}A_{R2}(\omega)e^{i\Delta\phi_{R2}}H^*_{22}(\omega)} \quad \text{Equation 3}$$

which reduces to:

$$\frac{H^*_{12}(\omega) \cdot H^*_{21}(\omega)}{H^*_{11}(\omega) \cdot H^*_{22}(\omega)} \quad \text{Equation 4}$$

Those of ordinary skill in the art will readily appreciate that all of the amplitude and phase errors have been mathematically canceled out in the reduction of Equation 3 to Equation 4. Those of ordinary skill will also appreciate that Equation 4 is equivalent to a compensated measurement obtained from a conventional tool configuration (e.g., as depicted on FIG. 1). Those of ordinary skill will still further appreciate that such compensation may also be applied for x-mode or y-mode transmissions.

With reference again to FIG. 4, the above described compensation can also be applied to deep reading receivers $R_3$, $R_4$, and $R_5$. To illustrate, consider a deep reading receiver $R_4$. The measured magnetic field due to each of the transmitters may be represented as:

$$H_{14}(\omega) = A_{T1}(\omega)e^{i\Delta\phi_{T1}}A_{R4}(\omega)e^{i\Delta\phi_{R4}}H^*_{14}(\omega)$$

$$H_{24}(\omega) = A_{T2}(\omega)e^{i\Delta\phi_{T2}}A_{R4}(\omega)e^{i\Delta\phi_{R4}}H^*_{24}(\omega) \quad \text{Equation 5}$$

Calculating a product of the far-to-near ratio yields $$\frac{A_{T1}(\omega)e^{i\Delta\phi_{T1}}A_{R4}(\omega)e^{i\Delta\phi_{R4}}H^*_{14}(\omega)}{A_{T2}(\omega)e^{i\Delta\phi_{T2}}A_{R4}(\omega)e^{i\Delta\phi_{R4}}H^*_{24}(\omega)} \quad \text{Equation 6}$$

which reduces to:

$$\frac{A_{T1}(\omega)e^{i\Delta\phi_{T1}}H^*_{14}(\omega)}{A_{T2}(\omega)e^{i\Delta\phi_{T2}}H^*_{24}(\omega)} \quad \text{Equation 7}$$

It is clear from Equation 7 that amplitude and phase errors introduced by the transmitters in the asymmetric receiver array remain. To eliminate those errors, we take measurements simultaneously from $R_1$ and $R_2$ as mathematically expressed in Equation 2. From those equations, we compute two far-to-near ratios as follows:

$$\frac{A_{T2}(\omega)e^{i\Delta\phi_{T2}}A_{R1}(\omega)e^{i\Delta\phi_{R1}}H^*_{21}(\omega)}{A_{T1}(\omega)e^{i\Delta\phi_{T1}}A_{R1}(\omega)e^{i\Delta\phi_{R1}}H^*_{11}(\omega)} = \frac{A_{T2}(\omega)e^{i\Delta\phi_{T2}}H^*_{21}(\omega)}{A_{T1}(\omega)e^{i\Delta\phi_{T1}}H^*_{11}(\omega)} \quad \text{Equation 8}$$

$$\frac{A_{T1}(\omega)e^{i\Delta\phi_{T1}}A_{R2}(\omega)e^{i\Delta\phi_{R2}}H^*_{12}(\omega)}{A_{T2}(\omega)e^{i\Delta\phi_{T2}}A_{R2}(\omega)e^{i\Delta\phi_{R2}}H^*_{22}(\omega)} = \frac{A_{T1}(\omega)e^{i\Delta\phi_{T1}}H^*_{12}(\omega)}{A_{T2}(\omega)e^{i\Delta\phi_{T2}}H^*_{22}(\omega)} \quad \text{Equation 9}$$

Dividing Equation 8 by Equation 9 yields:

$$\left[\frac{A_{T2}(\omega)e^{i\Delta\phi_{T2}}}{A_{T1}(\omega)e^{i\Delta\phi_{T1}}}\right]^2 \cdot \frac{H^*_{21}(\omega)H^*_{22}(\omega)}{H^*_{12}(\omega)H^*_{11}(\omega)} \quad \text{Equation 10}$$

Since receivers $R_1$ and $R_2$ have a much shorter spacing to the transmitters than do the deep reading receivers, it is typically safe to assume that the magnetic field responses at $R_1$ and $R_2$ are much less affected by the surrounding formation resistivity than for the deep reading receivers. Under this assumption, the undistorted magnetic fields at $R_1$ and $R_2$ will approximately be the same and Equation 10 reduces to:

$$\left[\frac{A_{T2}(\omega)e^{i\Delta\phi_{T2}}}{A_{T1}(\omega)e^{i\Delta\phi_{T1}}}\right]^2 \frac{H^*_{21}(\omega)H^*_{22}(\omega)}{H^*_{12}(\omega)H^*_{11}(\omega)} \approx \left[\frac{A_{T2}(\omega)e^{i\Delta\phi_{T2}}}{A_{T1}(\omega)e^{i\Delta\phi_{T1}}}\right]^2 \quad \text{Equation 11}$$

Taking the square root of Equation 11 and multiplying it by Equation 6 removes the amplitude and phase errors in the deep reading receiver.

Compensated directional resistivity measurements may also be computed as disclosed in, commonly assigned U.S. patent application Ser. No. 12/463,577 to Streinz, et al (now U.S. Pat. No. 7,990,153), which is hereby fully incorporated by reference. Such measurements may be obtained, however, utilizing a single collocated transmitter (e.g., $T_1$) and a single collocated receiver (e.g., $R_1$). For example, the z-mode and x-mode antennae in transmitter $T_1$ may be fired sequentially and the corresponding measured magnetic fields obtained via the z-mode and x-mode antennae in receiver $R_1$. The received magnetic fields may be represented mathematically in similar form to Equation 1, for example, as follows:

$$H_{zz}(\omega) = A_{Tz}(\omega)e^{i\Delta\phi_{Tz}}A_{Rz}(\omega)e^{i\Delta\phi_{Rz}}H^*_{zz}(\omega)$$

$$H_{zx}(\omega) = A_{Tz}(\omega)e^{i\Delta\phi_{Tz}}A_{Rx}(\omega)e^{i\Delta\phi_{Rx}}H^*_{zx}(\omega)$$

$$H_{xz}(\omega) = A_{Tx}(\omega)e^{i\Delta\phi_{Tx}}A_{Rz}(\omega)e^{i\Delta\phi_{Rz}}H^*_{xz}(\omega)$$

$$H_{xx}(\omega) = A_{Tx}(\omega)e^{i\Delta\phi_{Tx}}A_{Rx}(\omega)e^{i\Delta\phi_{Rx}}H^*_{xx}(\omega) \quad \text{Equation 12}$$

where $H_{zz}$, $H_{zx}$, $H_{xz}$, and $H_{xx}$ the induced magnetic field received by the z-mode and x-mode receivers for each of the transmitted electromagnetic waves (the transmitted z-mode and x-mode waves). As described above, the first index indicates the transmitter and the second index indicates the receiver. With continued reference to Equation 12, $A_{Tz}(\omega)$, $\Delta\phi_{Tz}$, $A_{Tx}(\omega)$ and $\Delta\phi_{Tx}$ represent amplitude and phase errors introduced by the z-mode and x-mode transmitting antennae, and $A_{Rz}(\omega)$, $\Delta\phi_{Rz}$, $A_{Rz}(\omega)$, and $\Delta\phi_{Rz}$ represent amplitude and phase errors introduced by the z-mode and x-mode receiving antennae.

Computing a ratio of a product of the cross components to a product of the coupling components of the received magnetic fields yields:

$$\frac{A_{Tz}(\omega)e^{i\Delta\phi_{Tz}}A_{Rx}(\omega)e^{i\Delta\phi_{Rx}}H_{zx}^*(\omega) \cdot A_{Tx}(\omega)e^{i\Delta\phi_{Tx}}A_{Rz}(\omega)e^{i\Delta\phi_{Rz}}H_{xz}^*(\omega)}{A_{Tz}(\omega)e^{i\Delta\phi_{Tz}}A_{Rz}(\omega)e^{i\Delta\phi_{Rz}}H_{zz}^*(\omega) \cdot A_{Tx}(\omega)e^{i\Delta\phi_{Tx}}A_{Rx}(\omega)e^{i\Delta\phi_{Rx}}H_{xx}^*(\omega)} \quad \text{Equation 13}$$

which reduces to:

$$\frac{H_{zx}^*(\omega) \cdot H_{xz}^*(\omega)}{H_{zz}^*(\omega) \cdot H_{xx}^*(\omega)} \quad \text{Equation 14}$$

Those of ordinary skill in the art will again readily appreciate that all of the amplitude and phase errors have been mathematically canceled out in the reduction of Equation 13 to Equation 14.

With reference again to FIGS. 3 through 5, measurement tool 100 may further include a controller (not shown) having, for example, a programmable processor (not shown), such as a microprocessor or a microcontroller, and may also include processor-readable or computer-readable program code embodying logic, including instructions for controlling the function of the tool. A suitable controller may be utilized, for example, to execute method 200 (FIG. 7). As such, the controller may be configured to cause (i) the transmitters to fire and (ii) the receivers to measure corresponding magnetic fields. The controller may also include instructions for computing compensated measurements, for example, as described above with respect to Equations 2 through 14.

A suitable controller may also optionally include other controllable components, such as sensors, data storage devices, power supplies, timers, and the like. The controller may also be disposed to be in electronic communication with various other sensors and/or probes for monitoring physical parameters of the borehole, such as a gamma ray sensor, a depth detection sensor, or an accelerometer, gyro or magnetometer to detect azimuth and inclination. A controller may also optionally communicate with other instruments in the drill string, such as telemetry systems that communicate with the surface. A controller may further optionally include volatile or non-volatile memory or a data storage device.

A suitable controller typically also includes conventional electronics utilized in transmitting and/or receiving an electromagnetic waveform. For example, the controller may include conventional electronics such as a variable gain amplifier for amplifying a relatively weak return signal (as compared to the transmitted signal) and/or various filters (e.g., low, high, and/or band pass filters), rectifiers, multiplexers, and other circuit components for processing the return signal. A suitable controller also typically includes conventional electronics for determining the amplitude and phase of a received electromagnetic wave as well as the attenuation and phase change between the first and second receivers. Such electronic systems are well known and conventional in the art.

Although the present invention and its advantages have been described in detail, it should be understood that various changes, substitutions and alternations can be made herein without departing from the spirit and scope of the invention as defined by the appended claims.

I claim:

1. A directional resistivity logging while drilling tool comprising:
    a logging while drilling tool body having a longitudinal axis;
    first and second adjacent transmitting antenna pairs deployed on the tool body, each transmitting antenna pair including first and second collocated transmitting antennae, the first collocated transmitting antenna having an axial magnetic moment and the second collocated transmitting antenna having a transverse magnetic moment;
    the first and second transmitting antenna pairs deployed axially between at least first and second receiving antennae pairs, each of the receiving antennae pairs including first and second collocated receiving antennae, the first collocated receiving antenna having an axial magnetic moment and the second collocated receiving antenna having a transverse magnetic moment.

2. The logging while drilling tool of claim 1, wherein the second collocated transmitting antenna and the second collocated receiving antenna comprise saddle coils.

3. The logging while drilling tool of claim 1, further comprising an electronic controller configured to (i) cause the transmitting antenna pairs to fire sequentially, (ii) cause each of the receiving antennae to receive an electromagnetic wave corresponding to each sequential firing of the transmitting antenna pairs, and (iii) compute compensated resistivity measurements from said received electromagnetic waves.

4. The logging while drilling tool of claim 1, wherein the first and second transmitting antennae pairs are configured to fire sequentially, the second transmitting antennae pairs being open circuit when the first transmitting antennae pairs is fired and the first transmitting antennae pairs being open circuit when the second transmitting antennae pairs is fired.

5. The logging while drilling tool of claim 1, wherein the first and second transmitting antennae pairs are deployed axially between at least first, second, third, and fourth receiving antennae pairs.

6. The logging while drilling tool of claim 1, further comprising at least one additional deep reading receiving antennae pair deployed on one axial end of the first and second adjacent transmitting antenna pairs.

7. A method for making a compensated logging while drilling resistivity measurement, the method comprising:
    (a) rotating a resistivity tool in a borehole, the tool including (i) first and second adjacent transmitters deployed on the tool body, (ii) the first and second transmitters deployed axially between at least one pair of receivers, the pair of receivers including first and second receivers, each of the first and second transmitters and the first and second receivers including collocated z-mode and x-mode antennae configured for transmitting and receiving z-mode and x-mode electromagnetic waves;
    (b) causing the first and second transmitters to sequentially transmit corresponding first and second z-mode electromagnetic waves;
    (c) causing the first and second receivers to receive each of the first and second z-mode electromagnetic waves transmitted in (b);
    (d) computing a compensated resistivity measurement from the electromagnetic waves received in (c); and wherein the electromagnetic waves received in (c) are expressed mathematically as follows:

$$H_{11}(\omega)=A_{T1}(\omega)e^{i\Delta\phi_{T1}}A_{R1}(\omega)e^{i\Delta\phi_{R1}}H^*_{11}(\omega)$$

$$H_{12}(\omega)=A_{T1}(\omega)e^{i\Delta\phi_{T1}}A_{R2}(\omega)e^{i\Delta\phi_{R2}}H^*_{12}(\omega)$$

$$H_{21}(\omega)=A_{T2}(\omega)e^{i\Delta\phi_{T2}}A_{R1}(\omega)e^{i\Delta\phi_{R1}}H^*_{21}(\omega)$$

$$H_{22}(\omega)=A_{T2}(\omega)e^{i\Delta\phi_{T2}}A_{R2}(\omega)e^{i\Delta\phi_{R2}}H^*_{22}(\omega)$$

wherein $H_{11}(\omega)$, $H_{12}(\omega)$, $H_{21}(\omega)$, and $H_{22}(\omega)$ represent said received waves, wherein a first index indicates the transmitter and a second index indicates the receiver, $A_{T1}(\omega)$, $\Delta\phi_{T1}$, $A_{T2}(\omega)$, and $\Delta\phi_{T2}$ represent amplitude and phase errors introduced by the first and second transmitters, and $A_{R1}(\omega)$, $\Delta\phi_{R1}$, $A_{R2}(\omega)$, and $\Delta\phi_{R2}$ represent amplitude and phase errors introduced by the first and second receivers.

8. The method of claim 7, wherein the compensated resistivity measurement may be expressed mathematically as follows:

$$\frac{H_{12}(\omega) \cdot H_{21}(\omega)}{H_{11}(\omega) \cdot H_{22}(\omega)}.$$

9. The method of claim 7, wherein the resistivity tool further includes at least one deep reading receiver located on one axial side of the lint and second transmitters; and the method further comprises:
   (e) causing the deep reading receiver to receive each of the first and second z-mode electromagnetic waves transmitted in (b).

10. The method of claim 9, further comprising:
   (f) applying the borehole compensation computed in (d) to the electromagnetic waves received in (e).

11. A method for making a compensated logging, while drilling directional resistivity measurement, the method comprising:
   (a) rotating a resistivity tool in a borehole, the tool including (i) first and second adjacent transmitters deployed on the tool body, (ii) the first and second transmitters deployed axially between at least one pair of receivers, the pair of receivers including first and second receivers, each of the first and second transmitters and the first and second receivers including collocated z-mode and x-mode antennae configured for transmitting and receiving z-mode and x-mode electromagnetic waves;
   (b) causing at least one of the transmitters to sequentially transmit first and second z-mode and x-mode electromagnetic waves;
   (c) causing at least one of the receivers to receive z-mode and x-mode components of each of the first and second electromagnetic waves transmitted in (b);
   (d) computing a compensated directional resistivity measurement from the electromagnetic waves received in (c); and
   wherein the electromagnetic waves received in (c) are expressed mathematically as follows:

$$H_{zz}(\omega)=A_{Tz}(\omega)e^{i\Delta\phi_{Tz}}A_{Rz}(\omega)e^{i\Delta\phi_{Rz}}H^*_{zz}(\omega)$$

$$H_{zx}(\omega)=A_{Tz}(\omega)e^{i\Delta\phi_{Tz}}A_{Rx}(\omega)e^{i\Delta\phi_{Rx}}H^*_{zx}(\omega)$$

$$H_{xz}(\omega)=A_{Tx}(\omega)e^{i\Delta\phi_{Tx}}A_{Rz}(\omega)e^{i\Delta\phi_{Rz}}H^*_{xz}(\omega)$$

$$H_{xx}(\omega)=A_{Tx}(\omega)e^{i\Delta\phi_{Tx}}A_{Rx}(\omega)e^{i\Delta\phi_{Rx}}H^*_{xx}(\omega)$$

wherein $H_{zz}$, $H_{zx}$, $H_{xz}$, and $H_{xx}$ represent said received waves, wherein a first index indicates the transmitter mode and the second index indicates the receiver mode, $A_{Tz}(\omega)$, $\Delta\phi_{Tz}$, $A_{Tx}(\omega)$, and $\Delta\phi_{Tx}$ represent amplitude and phase errors introduced by the z-mode and x-mode transmitting antennae, and $A_{Rz}(\omega)$, $\Delta\phi_{Rz}$, $A_{Rx}(\omega)$, and $\Delta\phi_{Rx}$ represent amplitude and phase errors introduced by the z-mode and x-mode receiving antennae.

12. The method of claim 11, wherein the compensated resistivity measurement is computed by calculating a ratio of a product of received cross-components to a product of received coupling-components.

13. The method of claim 12, wherein the ratio may be expressed mathematically as follows:

$$\frac{H_{zx}(\omega) \cdot H_{xz}(\omega)}{H_{zz}(\omega) \cdot H_{xx}(\omega)}.$$

14. The method of claim 11, wherein the resistivity tool further includes a plurality of deep reading receivers located on one axial side of the first and second transmitters and (c) further comprises causing each of the deep reading receivers to receive z-mode and x-mode components of each of the first and second electromagnetic waves transmitted in (b).

15. The method of claim 14, wherein (d) further comprises computing a compensated directional resistivity measurement at each of the deep reading receivers from the electromagnetic waves received in (c).

16. A method for making a logging while drilling directional resistivity measurement in a subterranean formation, the method comprising:
   (a) rotating a resistivity tool m a borehole, the tool including (i) first and second adjacent transmitters deployed on the tool body, (ii) the first and second transmitters deployed axially between at least one pair of receivers, (iii) at least three additional receivers, the first and second transmitters each including collocated axial and transverse antennae configured for transmitting axial and transverse electromagnetic waves, the receivers each including collocated axial and transverse antennae configured for receiving axial and transverse electromagnetic waves; and
   (b) causing at least one of said transmitter antennae to transmit an electromagnetic wave; and
   (c) causing each of said receiving antennae to receive the electromagnetic wave transmitted in (b) for a total of at least 10 received signals per transmitted electromagnetic wave.

17. The of claim 16, wherein:
   (b) further comprises causing the first and second transmitters to sequentially transmit corresponding electromagnetic waves in any order, a first z-mode electromagnetic wave, a second x-mode electromagnetic wave, a third z-mode electromagnetic wave, and a fourth x-mode electromagnetic wave; and
   (c) further comprises causing each of said receiving antennae to receive each electromagnetic wave transmitted in (b) for a total of at least 10 received signals per transmitted electromagnetic wave.

* * * * *